Patented Sept. 22, 1953

2,653,109

UNITED STATES PATENT OFFICE 2,653,109

LIGHT-RESPONSIVE FLUORESCENT MEDIA

Joseph L. Switzer, Cleveland Heights, Robert C. Switzer, South Euclid, and Richard A. Ward, Cleveland, Ohio, assignors, by mesne assignments, to said Joseph L. Switzer and said Robert C. Switzer No Drawing. Application August 21, 1942, Serial No. 455,610

12 Claims. (Cl. 117—33.5)

This invention relates to improvements in fluorescent media, and, more particularly, to improvements in fluorescent media which exhibit fluorescence under the influence of light.

Substances which emit light in response to fluorescigenous radiations (hereinafter termed "fluoragents") may be classified either as fluorescent pigments or as organic fluorescent dyes. The term "organic fluorescent dyes" as employed in this specification and the claims includes the soluble fluorescent dyestuffs, fluorescent intermediates, and like fluorescent organics, except unsubstituted hydrocarbons. Such organic dyes are often extremely brilliantly fluorescent in solution in suitable solvents or vehicles such as, for example, resins or gums.

A certain class of dissolved organic fluorescent dyes were observed to fluoresce extremely brilliantly under "black light," i. e., under ultraviolet in a substantial absence of visible light and were also known, in the case of known dyes, and observed, in the case of dyes which we have developed, to have very strong tinctorial powers when viewed under daylight, "daylight" being used as a generic term to describe natural sunlight or artificial light having a spectrum generally including ultraviolet and in which the visible spectrum approximates the visible spectrum of sunlight.

A general characteristic of the class of dyes in question was that the black light fluorescent color of these dissolved dyes was the same or approximately the same as the daylight color. This characteristic seemed somewhat unimportant until it was observed that in certain low concentrations and thickness of the medium in which the dyes were dissolved that the daylight brilliance of dissolved dyes was much greater than that which would be expected from the ordinary color phenomenon of selective light absorption and reflection, even though it was known that certain of the dyes, particularly the rhodamines, were very pure and brilliant dyes. It then became apparent that in addition to selectively reflecting a portion of the incident visible light, these dyes were also fluorescing under the influence of the incident daylight to augment the daylight color of the dyes. We have, therefore, termed these dyes "daylight fluorescent" dyes. Although the term "fluorescent" is usually employed in connection with the emission of light in response to invisible fluorescigenous radiation, the appropriateness of the term "daylight fluorescence" is evidenced by the fact that daylight fluorescent media made in accordance with our invention may actually emit and reflect more red light, for example, than is present in the incident light, whereas a pigment or dye which reflects, by the normal phenomenon of selective absorption and reflection, as much as sixty percent of the incident light in the reflected wave bands is regarded commercially as an excellent brilliant coloring agent.

The exceptionally brilliant color of daylight fluorescent media would apparently make such media excellent for use on signs, signals, displays, and like means for visually conveying intelligence in daylight as well as for decorative purposes. An apparently inherent characteristic of the dyes which can be employed in our daylight fluorescent media was that such dyes are extremely fugitive, particularly in the range of red dyes, where the phenomenon of daylight fluorescence is most noticeable in the dyes known to the prior art. Rhodamine dyes, for example, were notoriously fugitive to light, even in much greater concentration than the concentration which we have found to be critical for practical daylight fluorescence.

The reflection-absorption color of some known dyes of the daylight fluorescent type is so strikingly brilliant, even in concentrations greatly exceeding our now discovered practical limits, that many attempts have been made to stabilize such dyes. In general, the efforts of the prior art to stabilize dyes, which we know to exhibit brilliant daylight fluorescence when properly dispersed in suitable concentrations, may be said to have been successful in rendering the dyes light-fast, but such stabilizing methods usually remove any possibility of daylight fluorescence. For example, the textile dyeing industry assumed that it was impossible to obtain a stable rhodamine tint, but, by following the common practice of concentrating the dye very heavily upon the fabric, a brilliant relatively stable reflection-absorption red color was obtained; such relatively strong concentrations of the dye destroy the daylight fluorescence of the media. Other dye practices such as mordanting or forming salts, such as tungstates, also destroyed daylight fluorescence. The use of anti-oxidants or color filters also seriously reduced the daylight fluorescense and generally only increased the light-fastness of the dye two or three times. Some success was obtained by dissolving the dye in certain specific resins which apparently exert a stabilizing effect upon the dye; accordingly we may often use such resins in a carrier for the dyes in daylight fluorescent media made according to our invention.

It is an object of our invention to provide a daylight fluorescent media which will be resistant to exposure to daylight and, therefore, suitable as a media for signs, signals, displays and like means for visually conveying intelligence in daylight as well as for suitable brilliantly colored ornamentation. It is another object of our invention to provide a wide range of color in our daylight fluorescent media.

In general, we obtain the objects of our invention by dissolving or similarly dispersing a dye which is capable of fluorescing in daylight in a suitable carrier, the state of solution or like dispersion of the dye being hereinafter referred to as a "dispersion." The amount of dye in the carrier should be low, the practical critical limits of the concentration being set forth more fully below. In conjunction with the dye, either dispersed in the carrier for the dye but preferably dispersed in a colorless overcoating, we employ a colorless ultraviolet absorbing agent. The dye, the carrier, and the ultraviolet absorbing agent, either dispersed in the dye carrier or in its own carrier as an overcoat, comprise the "daylight fluorescent media" referred to throughout this specification and the claims. Daylight fluorescent media made according to our invention not only possess brilliant daylight fluorescence which permits our media to be seen at distances as much as two or three times greater than media which exhibit the same color by the normal phenomenon of selective absorption and reflection, but the effective life of the daylight fluorescent media is increased from 120 to 300 percent.

We have discovered that the ability of a dye to exhibit daylight fluorescence is dependent upon its dispersion and concentration in its carrier. As for dispersion, a daylight fluorescent dye must be dissolved in its carrier or suspended in a carrier so that it is molecularly dispersed in a manner similar to the molecular dispersion of the dye in a solution. As for the concentration of the dye in its carrier, we have discovered that the ratio (by weight) of the concentration of the dye in its carrier must decrease as the daylight fluorescent color varies from blue through red and that, as the ratio of concentration decreases, the ratio becomes increasingly critical. Thus, for example, in a blue or green daylight fluorescent media, the maximum ratio of dye to carrier for practical daylight fluorescence may vary from ten to five percent, respectively, whereas in red daylight fluorescent media, the maximum ratio of dye to carrier for practical daylight fluorescence is approximately one percent. Further, in concentrations below the dye-carrier concentration ratio of maximum efficiency, which varies from approximately one percent, in blue or green, to .1 percent, in red, the daylight fluorescence up to maximum brightness is directly proportional to the thickness of the media. Thus, for example, under a constant condition of daylight, the red daylight fluorescence of a media in which the dye-carrier ratio is .09 percent will equal the red daylight fluorescence of a media only half as thick but in which the dye-carrier ratio is .18 percent.

Our ultraviolet absorbing agent is colorless and is preferably dispersed in a carrier which is applied as an overcoating on the carrier in which the fluoragent is dispersed. The concentration of the ultraviolet absorbing agent in a stratum over the fluoragent may vary according to the efficiency of the agent. For maximum life of the daylight fluorescent media, however, the ultraviolet absorbing agent should be so concentrated that the fluorescence response to at least certain ranges of ultraviolet will be substantially eliminated.

The prolonged life of our daylight fluorescent media is most probably attributable to the exclusion from the media of the ultraviolet in the incident daylight and the destructive photochemical effect thereof. This explanation is not wholly satisfactory because, first, the ultraviolet absorbing agent, being colorless, does not exclude that visible portion of the incident light believed to have a destructive actinic effect, and second, the low dye-carrier concentration ratios necessary for daylight fluorescence are the very same low concentrations in which the dyes, particularly the reds, are so notoriously fugitive, thereby constituting a condition in the media which would presumably permit the unexcluded actinic radiations to cause rapid depreciation.

The extremely brilliant daylight fluorescence of our media is attributable to the fact that the fluoragent is dispersed in the carrier in a concentration below the critical limit and to the fact that the fluoragent not only reflects a portion of the visible incident daylight but also fluoresces under the influence of the visible light having a shorter wave length than the reflected light. At this time, however, we are unable to advance an explanation of why the ultraviolet absorbing agent produces no perceptible decrease in fluorescent brightness in daylight, particularly in view of the fact that the excluded fluorescigenous ultraviolet is commonly known to excite the fluoragent to extremely brilliant fluorescence.

Our fluoragents may be dispersed in molded articles, sheets, bars, or powders of polymerized resins or like plastic compositions, in suitable coating compositions, or in dyed textiles. In each case the carrier for our fluoragent and/or ultraviolet absorbing agent should be light-transmitting and preferably colorless and should not, of course, react in a deteriorating manner with the specific agent dispersed therein. For specific examples of fluorescent dyes incorporated in suitable plastic compositions and coating compositions, reference may be had to the copending application of Robert C. Switzer, Serial No. 255,399, filed February 9, 1939, now abandoned; Joseph L. Switzer and Robert C. Switzer, Serial No. 414,285, filed October 9, 1941; and Joseph L. Switzer and Robert C. Switzer, Serial No. 452,522, filed July 27, 1942. For specific examples of fluoragents incorporated in dyed textiles, reference may be had to the copending application of Joseph L. Switzer and Richard A. Ward, Serial No. 430,792, filed February 13, 1942.

Specific examples of suitable daylight fluorescent fluoragents and their daylight fluorescent colors are as follows:

| | |
|---|---|
| Meta diethylaminophenol phthalein hydrochloride | Red |
| Meta diethylaminophenol succein hydrochloride | Red |
| Meta monoethylaminophenol phthalein | Orange |
| The ethyl ester of meta monobutylaminophenol phthalein | Orange |
| Meta aminophenol phthalein hydrochloride | Yellow green |
| Di (para dimethylaminophenyl) ketone imine hydrochloride (derived from the imine) | Yellow green |
| 2,3, diphenyl N-phenyl quinoxalonium sulphate (derived from the hydroxide) | Green |
| p,p' Di [p'' (p''' aminobenzoylamino) benzoylamino] stilbene o,o' di [sodium sulphonate], [derived from p,p' di(benzoylamino) stilbene o,o' di (sodium sulphonate)] | Blue |

The foregoing fluoragents afford a pallette of colors from which a wide variety of colors and hues may be obtained.

Where our ultraviolet absorbing agents are carried in an overcoating, any suitable carrier having a light-fast colorlessness equal or greater to the daylight fluorescent life of the fluoragent in the combined media may be employed. Suitable carriers may be resinous carriers, such as suitable lacquers of ethyl cellulose or polymerized vinyl resins. Specific examples of our ultraviolet absorbing agents are:

2,3,diphenyl quinoxaline
    2,3,diphenyl 6 methylquinoxaline
    Ethylene glycol disalicylate
    5,7,dibromo 8 hydroxyquinoline It is to be understood that the foregoing specific examples of our daylight fluorescent fluoragents, the ultraviolet absorbing agents, and the carriers therefor are set forth by way of example and not as limitations. Other suitable fluoragents, substantially colorless ultraviolet absorbing agents, and carriers may be employed by those skilled in the art without departing from the spirit and scope of our invention. Our invention, therefore, is not limited to the specific embodiments disclosed, either in whole or in part, but by the scope of the following claims.

What is claimed is:

1. In an article of manufacture, a daylight fluorescent media comprising a light-transmitting carrier, a daylight fluorescing organic dye dispersed in said carrier, the maximum concentration ratio, by weight, of said dye in said carrier varying from five percent for blue and green dyes to one percent for red dyes, and a substantially colorless ultraviolet absorbing agent in a stratum over said dye.

2. In an article of manufacture, a daylight fluorescent media comprising a light-transmitting carrier, a daylight fluorescing organic dye dispersed in said carrier, the thickness of said carrier being directly proportional to the concentration ratio, by weight, of said dye in said carrier where the concentration ratio is less than the concentration ratio of maximum efficiency, and a substantially colorless ultraviolet absorbing agent in a stratum over said dye.

3. In an article of manufacture, a daylight fluorescent media comprising a light-transmitting carrier, a daylight fluorescing organic dye dispersed in said carrier, the maximum concentration ratio, by weight, of said dye in said carrier varying from five percent for blue and green dyes to one percent for red dyes, and the thickness of said carrier being directly proportional to the concentration ratio of said dye in said carrier where the concentration ratio is less than the concentration ratio of maximum efficiency, said concentration ratio of maximum efficiency varying from one percent for blue and green dyes to eighteen one-hundredths of one percent for red dyes, and a substantially colorless ultraviolet absorbing agent in a stratum over said dye.

4. In a daylight fluorescent media in which a fluorescent organic dye is dispersed in a light-transmitting carrier to allow said dye to fluoresce in response to incident daylight, a substantially colorless ultraviolet absorbing agent in a stratum over said dye.

5. In a daylight fluorescent media in which a florescent organic dye is dispersed in a light-transmitting carrier to allow said dye to fluoresce in response to incident daylight, a substantially colorless ultraviolet absorbing agent in the carrier.

6. In a daylight fluorescent media in which a fluorescent organic dye is dispersed in a light-transmitting carrier to allow said dye to fluoresce in response to incident daylight, a substantially colorless overcoat on the carrier in which the dye is dispersed, said overcoat comprising a substantially colorless carrier and a substantially colorless ultraviolet absorbing agent.

7. As an article of manufacture, a daylight fluorescent media comprising a light-transmitting first carrier, a daylight fluorescent dye dispersed in said first carrier, a light-transmitting second carrier covering at least a portion of the first carrier, and a substantially colorless ultraviolet absorbing agent in said second carrier, the amount of said ultraviolet absorbing agent in said second carrier being an amount at least sufficient to prevent the daylight fluorescent dye in the portion of said first carrier covered by said second carrier from fluorescing in response to selected ranges of filtered ultraviolet incident to said media.

8. The method of producing a daylight fluorescent media comprising the steps of dispersing in a light-transmitting carrier an organic dye capable of fluorescing in response to visible fluorescigenous energy in a concentration low enough to permit said dye to fluoresce in response to visible light and dispersing in said carrier a substantially colorless agent capable of absorbing ultraviolet and transmitting visible light.

9. The method of producing a daylight fluorescent media comprising the steps of dispersing in a light-transmitting carrier an organic dye capable of fluorescing in response to visible light in a concentration low enough to permit said dye to fluoresce in response to visible light and dispersing in a stratum over said dye an agent capable of absorbing invisible fluorescigenous radiations and transmitting visible light.

10. The method of producing a daylight fluorescent media comprising the steps of dispersing in a light-transmitting first carrier an organic dye capable of fluorescing in response to visible light in a concentration low enough to allow said dye to fluoresce in response to visible light, dispersing a substantially colorless ultraviolet absorbing agent in a second carrier, and applying said second carrier over said first carrier.

11. As an article of manufacture, a daylight fluorescent media comprising the combination of a fluoragent comprised of at least one of the group of fluorescent dyes consisting of rhodamines and dyes derived from di (para dimethylaminophenyl) ketone imine; 2,3, diphenyl N-phenyl quinoxalonium hydroxide; and p, p' di (benzoylamino) stilbene o,o' di (sodium sulphonate); a substantially colorless ultraviolet absorbing agent; and light-transmitting means for carrying said agents, said fluoragent being dispersed in said carrier means in a concentration low enough to permit said fluoragent to fluoresce in response to visible light.

12. An article of manufacture as defined in claim 11 in which said colorless ultraviolet absorbing agent is comprised of at least one of the group consisting of ethylene glycol disalicylate, and 5, 7, dibromo 8 hydroxyquinoline, and a substantially colorless substance containing a nucleus of 2,3, diphenylquinoxaline.

JOSEPH L. SWITZER.
ROBERT C. SWITZER.
RICHARD A. WARD.

(References on following page)

References Cited in the file of this patent

UNITED STATES PATENTS

| Number | Name | Date |
|---|---|---|
| 907,598 | Hewitt | Dec. 22, 1908 |
| 2,008,290 | Murray | July 16, 1935 |
| 2,062,179 | Hunter | Nov. 24, 1936 |
| 2,108,503 | Murray | Feb. 15, 1938 |
| 2,152,856 | Switzer | Apr. 4, 1939 |
| 2,267,758 | Sell | Dec. 30, 1941 |
| 2,286,780 | Yule | June 16, 1942 |
| 2,296,589 | Yule | Sept. 22, 1942 |
| 2,310,740 | Leavy | Feb. 9, 1943 |

FOREIGN PATENTS

| Number | Country | Date |
|---|---|---|
| 101,062 | Australia | May 13, 1937 |
| 503,760 | Great Britain | Apr. 6, 1939 |
| 507,037 | Great Britain | June 8, 1939 |